(12) United States Patent
Chaumonnot et al.

(10) Patent No.: US 8,236,419 B2
(45) Date of Patent: Aug. 7, 2012

(54) AMORPHOUS SILICON-CONTAINING MATERIAL WITH HIERARCHICAL AND ORGANIZED POROSITY

(75) Inventors: Alexandra Chaumonnot, Lyons (FR); Stephanie Pega, Aulnay sous Bois (FR); Clement Sanchez, Gif-sur-Yvette (FR); Cedric Boissiere, Paris (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 79 days.

(21) Appl. No.: 12/676,759

(22) PCT Filed: Aug. 19, 2008

(86) PCT No.: PCT/FR2008/001199
§ 371 (c)(1),
(2), (4) Date: Jul. 21, 2010

(87) PCT Pub. No.: WO2009/056711
PCT Pub. Date: May 7, 2009

(65) Prior Publication Data
US 2010/0291387 A1   Nov. 18, 2010

(30) Foreign Application Priority Data
Sep. 7, 2007   (FR) ..................................... 07 06297

(51) Int. Cl.
*B32B 5/66*   (2006.01)

(52) U.S. Cl. .......... 428/402; 428/403; 428/404; 502/63; 502/64; 502/69; 502/70

(58) Field of Classification Search .................. 428/402, 428/403, 404; 502/63, 64, 69, 70
See application file for complete search history.

(56) References Cited

U.S. PATENT DOCUMENTS

| | | | |
|---|---|---|---|
| 6,866,925 B1 | 3/2005 | Chane-Ching | |
| 7,807,598 B2 * | 10/2010 | Euzen et al. | 502/71 |
| 7,851,320 B2 * | 12/2010 | Chaumonnot et al. | 438/335 |
| 7,994,085 B2 * | 8/2011 | Chaumonnot et al. | 502/63 |
| 2006/0030477 A1 | 2/2006 | Chaumonnot et al. | |

FOREIGN PATENT DOCUMENTS

| | | | |
|---|---|---|---|
| EP | 1627853 | * | 2/2006 |
| EP | 1627853 A1 | | 2/2006 |
| WO | 0132558 A1 | | 5/2001 |
| WO | PCTFR0801199 R | | 6/2009 |

* cited by examiner

*Primary Examiner* — Leszek Kiliman
(74) *Attorney, Agent, or Firm* — Millen, White, Zelano & Branigan, P.C.

(57) ABSTRACT

Material with hierarchical porosity consisting of at least two elementary spherical particles, each one of said particles comprising a matrix based on silicon oxide, mesostructured, having a mesopore diameter ranging between 1.5 and 30 nm and exhibiting amorphous and microporous walls of thickness ranging between 1.5 and 50 nm, said elementary spherical particles having a maximum diameter of 200 microns. The matrix based on silicon oxide can contain aluminium. The preparation of said material is also described.

17 Claims, No Drawings

AMORPHOUS SILICON-CONTAINING MATERIAL WITH HIERARCHICAL AND ORGANIZED POROSITY

FIELD OF THE INVENTION

The present invention relates to the field of materials containing silicon, notably metallosilicate materials and more precisely aluminosilicate materials, with hierarchical porosity in the microporosity and mesoporosity domains and organized porosity in the mesoporosity domain. It also relates to the preparation of these materials that are obtained by means of the synthesis technique referred to as aerosol synthesis.

BACKGROUND OF THE INVENTION

New synthesis strategies allowing to obtain materials of well-defined porosity in a very wide range, from microporous materials to macroporous materials to hierarchical porosity materials, i.e. having pores of several sizes, have known a very large development within the scientific community since the mid-90s (G. J. de A. A. Soler-Illia, C. Sanchez, B. Lebeau, J. Patarin, *Chem. Rev.*, 2002, 102, 4093). In particular, considerable work has been done on the development of materials having a microporosity of zeolitic nature and a mesoporosity so as to simultaneously benefit from the catalytic properties specific to zeolites and from the catalytic and especially the textural properties of the mesoporous phase.

A technique that is commonly used to generate materials having such biporosity consists in directly creating mesopores within zeolite crystals by subjecting the zeolite to a steam-hydrothermal treatment, also referred to as steaming. Under the effect of this treatment, the mobility of the tetrahedric atoms that make up the framework of the zeolite is increased to such an extent that some of these atoms are extracted from the network, which causes formation of amorphous zones that can be cleared to give way to mesoporous cavities (A. H. Jansen, A. J. Koster, K. P. de Jong, *J. Phys. Chem. B*, 2002, 106, 11905). The formation of such cavities can also be obtained by subjecting the zeolite to an acid treatment (H. Ajot, J. F. Joly, J. Lynch, F. Raatz, P. Caullet, *Stud. Surf. Sci. Catal.*, 1991, 62, 583). These methods however have the drawback of making part of the zeolite partly amorphous and of modifying the properties thereof through variation of the chemical composition. In any case, the mesoporosity thus introduced allows to eliminate or at least to limit diffusion limitation problems encountered in microporous materials, mesopores having much greater diffusion factors than micropores and thus allowing access to the active sites of the zeolites (P. B. Weisz, *Chemtech*, 1973, 3, 498).

More recently, much work has been done on the elaboration of mixed mesostructured/zeolite materials, mesostructured materials affording the additional advantage of a perfectly organized and calibrated porosity in the mesopore range.

It can be briefly reminded here that mesostructured materials are conventionally obtained via synthesis methods referred to as soft chemistry methods that consist in bringing together, in an aqueous solution or in polar solvents, inorganic precursors with structuring agents, generally molecular or macromolecular surfactants, ionic or neutral. Control of electrostatic interactions or of interactions through hydrogen bonds between the inorganic precursors and the structuring agent jointly linked with hydrolysis/condensation reactions of the inorganic precursor leads to a cooperative assembly of the organic and inorganic phases generating micellar aggregates of surfactants of uniform and controlled size within an inorganic matrix. Clearance of the porosity is then obtained by surfactant elimination, which is conventionally carried out by means of chemical extraction processes or by thermal treatment. Depending on the nature of the inorganic precursors and of the structuring agent used, and on the operating conditions applied, several families of mesostructured materials have been developed, such as the M41S family obtained using long-chain quaternary ammonium salts as the structuring agent (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, *J. Am. Chem. Soc.*, 1992, 114, 27, 10834) or the SBA family obtained using three-block copolymers as the structuring agent (D. Zhao, J. Feng, Q. Huo, N. Melosh, G. H. Fredickson, B. F. Chmelka, G. D. Stucky, *Science*, 1998, 279, 548).

Several synthesis techniques allowing elaboration of such mixed mesostructured/zeolite materials have thus been listed in the open literature. A first synthesis technique consists in synthesizing in a first stage a mesostructured aluminosilicate material according to the conventional methods described above, then, in a second stage, in impregnating this material with a structuring agent commonly used in the synthesis of zeolitic materials. A suitable hydrothermal treatment leads to a zeolitization of the amorphous walls of the initial mesostructured aluminosilicate (K. R. Koletstra, H. van Bekkum, J. C. Jansen, *Chem. Commun.*, 1997, 2281; D. T. On, S. Kaliaguine, *Angew. Chem. Int. Ed.*, 2001, 40, 3248; D. T. On, D. Lutic, S. Kaliaguine, *Micropor. Mesopor. Mater.*, 2001, 44, 435; M. J. Verhoef, P. J. Kooyman, J. C. van der Waal, M. S. Rigutto, J. A. Peters, H. van Bekkum, *Chem. Mater.*, 2001, 13, 683; S. Kaliaguine, D. T. On, U.S. Pat. No. 6,669,924B1, 2003). A second synthesis technique consists in bringing together a colloidal solution of zeolite seeds (also referred to as protozeolite entities) and a surfactant commonly used to create a mesostructuration of the final material. The basic idea here is to simultaneously generate the elaboration of an inorganic matrix of organized mesoporosity and the growth, within this matrix, of zeolite seeds so as to ideally obtain a mesostructured aluminosilicate material with crystallized walls (Z. Zhang et al., *J. Am. Chem. Soc.*, 2001, 123, 5014; Y. Liu et al., *J. Am. Chem. Soc.*, 2000, 122, 8791). A variant of these two techniques consists in starting from a mixture of aluminium and silicon precursors in the presence of two structuring agents, one likely to generate a zeolitic system and the other likely to generate a mesostructuration. This solution is then subjected to two crystallization stages under variable hydrothermal treatment conditions, the first stage leading to the formation of the mesoporous structure of organized porosity and the second stage leading to the zeolitization of the amorphous walls (A. Karlsson, M. Stöcker, R. Schmidt, *Micropor. Mesopor. Mater.*, 1999, 27, 181; L. Huang, W. Guo, P. Deng, Z. Xue, Q. Li, *J. Phys., Chem. B*, 2000, 104, 2817). All of these synthesis methods have the drawback of damaging the mesostructure and thus to lose the advantages thereof in cases where growth of the zeolite seeds or zeolitization of the walls is not perfectly controlled, which makes these techniques delicate to implement.

It can be noted that it is also possible to directly elaborate composite mesostructured/zeolite materials so as to take advantage of the catalytic properties specific to each one of these phases. This can be done through thermal treatment of a mixture of a zeolite seed solution and of a mesostructured aluminosilicate seed solution (P. Prokesova, S. Mintova, J. Cejka, T. Bein, *Micropor. Mesopor. Mater.*, 2003, 64, 165) or through growth of a zeolite layer at the surface of a presynthesized mesostructured aluminosilicate (D. T. On, S. Kaliaguine, *Angew. Chem. Int. Ed.,* 2002, 41, 1036).

To the exclusion of the mesoporous zeolitic materials obtained through post-treatment of a zeolite, we note that, from an experimental point of view, all these materials are obtained by direct precipitation of inorganic precursors in the presence or not of structuring agents within an aqueous solution or in polar solvents, this stage being in most cases followed by one or more ripening stages in an autoclave. The elementary particles usually obtained exhibit no regular shape and they are characterized by a size ranging between 200 and 500 nm, and often well above 500 nm.

In the case of non-zeolitic mesostructured materials, it is possible to achieve cooperative self-assembly of the structuring agent with the inorganic precursors hydrolyzed and condensed at various degrees of advancement by progressive evaporation of a solution of these reactants whose structuring agent concentration is below the critical micellar concentration ($c_{mc}$) known to the person skilled in the art, which leads to either the formation of mesostructured films in the case of deposition on a substrate (dip-coating technique), or to the formation of a mesostructured powder after atomization of the solution (aerosol technique). By way of example, patent U.S. Pat. No. 6,387,453 discloses the formation of mesostructured organic-inorganic hybrid films using the dip-coating technique; besides, these authors have used the aerosol technique to elaborate purely silicic mesostructured materials (C. J. Brinker, Y. Lu, A. Sellinger, H. Fan, *Adv. Mater.,* 1999, 11, 7).

SUMMARY OF THE INVENTION

The invention relates to a material with hierarchical porosity in the microporosity and mesoporosity domains and organized porosity in the mesoporosity domain, consisting of at least two elementary spherical particles, each one of said particles comprising a matrix based on silicon oxide, mesostructured, having a mesopore diameter ranging between 1.5 and 30 nm and exhibiting amorphous and microporous walls of thickness ranging between 1 and 50 nm, said elementary spherical particles having a maximum diameter of 200 microns. Said matrix based on silicon oxide optionally also comprises at least one element X selected from among aluminium, iron, boron, indium and gallium, preferably aluminium. The present invention also relates to the preparation of the material according to the invention. The method of preparing the material according to the invention comprises:
a) preparing a clear solution containing the protozeolite entity precursor elements, i.e. at least one structuring agent, at least one silicic precursor and possibly at least one precursor of at least one element X selected from among aluminium, iron, boron, indium and gallium, preferably aluminium; b) mixing into a solution at least one surfactant and at least said clear solution obtained in stage a) such that the ratio of the volumes of inorganic and organic matter $V_{inorganic}/V_{organic}$ ranges between 0.26 and 4; c) aerosol atomizing said solution obtained in stage b) so as to lead to the formation of spherical droplets; d) drying said droplets; and e) eliminating said structuring agent and said surfactant so as to obtain an amorphous material with hierarchical porosity in the microporosity and mesoporosity domains and organized porosity in the mesoporosity domain.

The microporosity induced by the amorphous walls of the material according to the invention results not only from the use of a solution comprising the protozeolite entity precursor elements according to stage a) of the method of the invention, but also from aerosol atomizing the solution comprising at least one surfactant and a clear solution according to stage c) of the method of the invention. The mesostructuration of the material according to the invention results from the phenomenon of micellization or self-assembly by evaporation induced by the aerosol technique, according to stage c) of the method of the invention, generated by the presence of the surfactant and of the inorganic phase from the solution containing the protozeolite entity precursor elements.

INTEREST OF THE INVENTION

The material according to the invention that comprises a mesostructured inorganic matrix, based on silicon oxide, with microporous and amorphous walls, simultaneously exhibits the textural properties specific to microporous materials and to mesostructured materials. Preferably, the matrix based on silicon oxide forming each one of the elementary spherical particles of the material according to the invention comprises, in addition to silicon, at least one element X selected from among aluminium, iron, boron, indium and gallium, preferably aluminium, so as to form an amorphous aluminosilicate matrix. The material according to the invention then exhibits, when X is aluminium, greater acidobasicity properties than the amorphous aluminosilicate materials of the prior art, devoid of protozeolite entity precursors, and prepared according to synthesis protocols known to the person skilled in the art using inorganic silica and alumina precursors. Besides, the presence, within the same spherical particle of micrometric or even nanometric size, of mesopores organized in a microporous and amorphous inorganic matrix leads to preferential access of the reactants and of the reaction products to the microporous sites when the material according to the invention is used in potential industrial applications. Furthermore, the material according to the invention consists of spherical elementary particles, the diameter of these particles being maximum 200 μm, preferably less than 100 μm, advantageously ranging between 50 nm and 20 μm, more advantageously between 50 nm and 10 μm and most advantageously between 50 nm and 3 μm. The limited size of these particles and their homogeneous spherical size provides better diffusion of the reactants and of the reaction products when the material according to the invention is used in potential industrial applications by comparison with materials known from the prior art that come in form of elementary particles of non-homogeneous shape, i.e. irregular, and of size often well above 500 nm.

DETAILED DESCRIPTION

The object of the present invention is a material with hierarchical porosity consisting of at least two elementary spherical particles, each one of said particles comprising a matrix based on silicon oxide, mesostructured, having a mesopore diameter ranging between 1.5 and 30 nm and exhibiting amorphous and microporous walls of thickness ranging between 1.5 and 50 nm, said elementary spherical particles having a maximum diameter of 200 microns.

The material according to the invention is a material with hierarchical porosity in the microporosity and mesoporosity domains and organized porosity in the mesoporosity domain. What is understood to be a material with hierarchical and organized porosity, in the sense of the present invention, is a material having a double porosity on the scale of each one of said spherical particle: a mesoporosity, i.e. the presence of pores organized on the mesoporous scale having a uniform diameter ranging between 1.5 and 30 nm, preferably between 1.5 and 15 nm, homogeneously and evenly distributed in each one of said particles (mesostructuration), and a microporosity induced by the amorphous walls, the characteristics of this microporosity depending on the constituent protozeolite entities of the amorphous walls of the matrix of each spherical particle of the material according to the invention. The microporosity is characterized by the presence of micropores, within said amorphous walls, of diameter below 1.5 nm. The material according to the invention also exhibits an intraparticular textural macroporosity. It can be noted that a porosity of microporous nature can also result from the imbrication of the surfactant used to prepare the material according to the invention with the inorganic wall at the level of the organic-inorganic interface developed upon mesostructuration of the inorganic component of said material according to the invention. Advantageously, none of the spherical particles making up the material according to the invention has macropores.

In accordance with the invention, the matrix based on silicon oxide forming each of the spherical particles of the material according to the invention has amorphous walls exclusively consisting of protozeolite entities that are at the origin of the microporosity present within each spherical particle of the material according to the invention. Protozeolite entities are species prepared from reactants used for the synthesis of zeolites, and the preparation of said species has not been brought to the crystallized zeolite formation stage. Said small-size protozeolite entities are therefore not detected when characterized by wide-angle X-ray diffraction. More precisely and in accordance with the invention, the protozeolite entities that fully and homogeneously make up the amorphous microporous walls of the matrix of each spherical particle of the material according to the invention are species resulting from bringing together at least one structuring agent, at least one silicic precursor and optionally at least one precursor of at least one element X selected from among aluminium, iron, boron, indium and gallium, preferably aluminium, under variable time and temperature conditions allowing to obtain a clear solution, and said species can serve as a primer for the synthesis of any zeolite known to the person skilled in the art and, in particular, but in a non-exhaustive manner, the synthesis of the zeolites listed in "Atlas of zeolite framework types", 5$^{th}$ revised Edition, 2001, C. Baerlocher, W. M. Meier, D. H. Olson.

The protozeolite entities that fully make up the amorphous walls of the matrix of each particle of the material according to the invention and at the origin of the microporosity thereof preferably are species for priming at least one zeolite selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, mordenite, NU-87, NU-88, NU-86, NU-85, IM-5, IM-12, Ferrierite and EU-1. More preferably, the protozeolite entities that fully make up the amorphous and microporous walls of the matrix of each particle of the material according to the invention are species for priming at least one zeolite selected from among the zeolites of MFI, BEA, FAU and LTA structural type.

In accordance with the invention, the matrix based on silicon oxide forming each of the elementary spherical particles of the material according to the invention is either entirely silicic or it comprises, in addition to silicon, at least one element X selected from among aluminium, iron, boron, indium and gallium, preferably aluminium. Thus, the protozeolite entities that fully make up the amorphous and microporous walls of the matrix of each particle of the material according to the invention and at the origin of the microporosity thereof advantageously are species for priming at least one zeolite, either entirely silicic or containing, in addition to silicon, at least one element X selected from among aluminium, iron, boron, indium and gallium, preferably aluminium. When X is aluminium, the matrix of the material is in this case an amorphous aluminosilicate, precursor of a crystallized aluminosilicate material. This amorphous aluminosilicate has a Si/Al molar ratio identical to that of the solution of the silicic and aluminic precursors leading to the formation of the protozeolite entities that fully make up the amorphous and microporous walls of the matrix.

The matrix based on silicon oxide contained in each spherical particle making up the material according to the invention is mesostructured: it exhibits mesopores of uniform diameter, i.e. identical for each mesopore, ranging between 1.5 and 30 nm, preferably between 1.5 and 15 nm, homogeneously and evenly distributed in each spherical particle. The matter located between the mesopores of each one of said spherical particles is microporous and fully amorphous, and it forms walls whose thickness ranges between 1 and 50 nm, preferably between 1 and 30 nm. The thickness of the walls corresponds to the distance between a first mesopore and a second mesopore, the second mesopore being the pore that is the closest to said first mesopore. The mesoporosity organization described above leads to a structuration of the matrix based on silicon oxide that can be hexagonal, vermicular or cubic, preferably vermicular.

The mesostructuration of the material according to the invention can be of vermicular, cubic or hexagonal type depending on the nature of the surfactant used for the material according to the invention.

In accordance with the invention, said elementary spherical particles making up the material according to the invention have a maximum diameter of 200 microns, preferably less than 100 microns, advantageously ranging between 50 nm and 20 µm, more advantageously ranging between 50 nm and 10 µm, and most advantageously ranging between 50 and 3 µm. More precisely, they are present in the material according to the invention in form of aggregates.

The material according to the invention advantageously has a specific surface area ranging between 100 and 1100 m$^2$/g, more advantageously between 200 and 1000 m$^2$/g.

The material according to the invention advantageously has a mesopore volume measured by nitrogen volumetric analysis ranging between 0.01 and 1 ml/g and a micropore volume measured by nitrogen volumetric analysis ranging between 0.01 and 0.4 ml/g.

The object of the present invention also is the preparation of the material according to the invention. Said method of preparing the material according to the invention comprises: a) preparing a clear solution containing the protozeolite entity precursor elements, i.e. at least one structuring agent, at least one silicic precursor and possibly at least one precursor of at least one element X selected from among aluminium, iron, boron, indium and gallium, preferably aluminium; b) mixing into a solution at least one surfactant and at least said clear solution obtained in stage a) such that the ratio of the volumes of inorganic and organic matter ranges between 0.26 and 4; c) aerosol atomizing said solution obtained in stage b) so as to lead to the formation of spherical droplets; d) drying said droplets; and e) eliminating said structuring agent and said surfactant so as to obtain an amorphous material with hierarchical porosity in the microporosity and mesoporosity domains and organized porosity in the mesoporosity domain.

In accordance with stage a) of the preparation method according to the invention, the clear solution containing the protozeolite entity precursor elements, i.e. at least one structuring agent, at least one silicic precursor and optionally at least one precursor of at least one element X selected from among aluminium, iron, boron, indium and gallium, preferably aluminium, is produced from operating protocols known to the person skilled in the art.

The silicic precursor used for carrying out stage a) of the method according to the invention is selected from among the silicon oxide precursors known to the person skilled in the art. In particular, a silicic precursor selected from among the silica precursors commonly used in the synthesis of zeolites is advantageously used, for example powdered solid silica, silicic acid, colloidal silica, dissolved silica or tetraethoxysilane, also referred to as tetraethylorthosilicate (TEOS). The silicic precursor preferably is TEOS.

The precursor of element X optionally used for carrying out stage a) of the method according to the invention can be any compound comprising element X and that can release this element in solution, notably in aqueous or aquo-organic solution, in reactive form. In the preferred case where X is aluminium, the aluminic precursor advantageously is an inorganic aluminium salt of formula $AlZ_3$, Z being a halogen, a nitrate or a hydroxide. Preferably, Z is chlorine. The aluminic precursor can also be an aluminium sulfate of formula $Al_2(SO_4)_3$. The aluminic precursor can also be an organometallic precursor of formula $Al(OR)_3$ where R=ethyl, isopropyl, n-butyl, s-butyl ($Al(O^sC_4H_9)_3$) or t-butyl or a chelated precursor such as aluminium acetylacetonate ($Al(C_5H_8O_2)_3$). Preferably, R is s-butyl. The aluminic precursor can also be sodium or ammonium aluminate, or alumina proper, in one of its crystalline phases known to the person skilled in the art (alpha, delta, teta, gamma), preferably in hydrated form or in a form that can be hydrated.

It is also possible to use mixtures of the aforementioned precursors. Some or all of the aluminic and silicic precursors can optionally be added in form of a single compound comprising both aluminium atoms and silicon atoms, an amorphous silica alumina for example.

The structuring agent used for carrying out stage a) of the method according to the invention can be ionic or neutral depending on the nature of the zeolite that would be obtained from said protozeolite entities. The structuring agents from the following non-exhaustive list are frequently used: nitrogen-containing organic cations such as tetrapropylammonium (TPA), elements from the alkaline family (Cs, K, Na, etc.), crown ethers, diamines, as well as any other structuring agent known to the person skilled in the art for zeolite synthesis.

The clear solution containing the protozeolite entity precursor elements according to stage a) of the material preparation method of the invention is generally obtained by preparing a reaction mixture containing at least one silicic precursor, optionally at least one precursor of at least one element X selected from among aluminium, iron, boron, indium and gallium, preferably at least one aluminic precursor, and at least one structuring agent. The reaction mixture is either aqueous or aquo-organic, a water-alcohol mixture for example. A basic reaction medium is preferably used throughout the various stages of the method according to the invention in order to favour the development of the protozeolite entities making up the amorphous and microporous walls of the matrix of each particle of the material according to the invention. The basicity of the solution is advantageously provided by the basicity of the structuring agent used or by basification of the reaction mixture through addition of a basic compound, for example an alkaline metal hydroxide, preferably sodium hydroxide. The reaction mixture can be subjected to hydrothermal conditions under autogenous pressure, optionally by adding a gas, nitrogen for example, at a temperature ranging between ambient temperature and 200° C., preferably between ambient temperature and 170° C., more preferably at a temperature that does not exceed 120° C. until formation of a clear solution containing the precursor elements of the protozeolite entities that make up the amorphous and microporous walls of the matrix of each spherical particle of the material according to the invention. According to a preferred method of operation, the reaction mixture containing at least one structuring agent, at least one silicic precursor and optionally at least one precursor of at least one element X selected from among aluminium, iron, boron, indium and gallium is ripened at ambient temperature so as to obtain a clear solution containing the precursor elements of protozeolite entities likely to generate the formation of crystallized zeolite entities.

In accordance with stage a) of the method according to the invention, the precursor elements of the protozeolite entities present in the clear solution are synthesized according to operating protocols known to the person skilled in the art. In particular, for a material according to the invention the matrix of each particle of which consists of beta protozeolite entities, a clear solution containing precursor elements of beta protozeolite entities is prepared according to the operating protocol described by P. Prokesova, S. Mintova, J. Cejka, T. Bein et al., *Micropor. Mesopor. Mater.*, 2003, 64, 165. For a material of the invention the matrix of each spherical particle of which consists of protozeolite entities of FAU type, a clear solution containing precursor elements of protozeolite entities of FAU type is prepared from the operating protocols described by Y. Liu, W. Z. Zhang, T. J. Pinnavaia et al., *J. Am. Chem. Soc.*, 2000, 122, 8791 and K. R. Kloetstra, H. W. Zandbergen, J. C. Jansen, H. vanBekkum, *Microporous Mater.*, 1996, 6, 287. For a material according to the invention the matrix of each spherical particle of which consists of protozeolite entities of ZSM-5 type, a clear solution containing precursor elements of ZSM-5 protozeolite entities is prepared from the operating protocol described by A. E. Persson, B. J. Schoeman, J. Sterte, J.-E. Otterstedt, *Zeolites*, 1995, 15, 611. In the particular case of a purely silicic material, the clear solution containing the precursor elements of silicalite protozeolite entities making up the walls of said material of the invention is advantageously prepared according to the operating protocol described by A. E. Persson, B. J. Schoeman, J. Sterte, J.-E. Otterstedt, *Zeolites*, 1994, 14, 557.

In accordance with stage b) of the material preparation method according to the invention, the surfactant used is an ionic or a non-ionic surfactant or a mixture thereof. Preferably, the ionic surfactant is selected from among anionic surfactants such as sulfates, like for example sodium dodecylsulfate (SDS). Preferably, the non-ionic surfactant can be any copolymer having at least two parts of different polarities conferring amphiphilic macromolecule properties on them. These copolymers can comprise at least one block belonging to the non-exhaustive list of the following polymer families: fluorinated polymers (—[$CH_2$—$CH_2$—$CH_2$—$CH_2$—O—CO—R1- with R1=$C_4F_9$, $C_8F_{17}$, etc.), biological polymers such as polyamino acids (poly-lysine, alginates, etc.), dendrimers, polymers consisting of poly(alkylene oxide) chains. Any other copolymer of amphiphilic character known to the person skilled in the art can be used if it allows to obtain a stable solution in stage b) of the preparation method according to the invention, such as poly(styrene-b-acrylamide) for example (S. Förster, M. Antionnetti, *Adv. Mater,* 1998, 10, 195-217; S. Förster, T. Plantenberg, *Angew. Chem. Int. Ed,* 2002, 41, 688-714; H. Cölfen, *Macromol. Rapid Commun,* 2001, 22, 219-252). Preferably, a block copolymer consisting of poly(alkylene oxide) chains is used within the scope of the present invention. Said block copolymer is preferably a block copolymer having two, three or four blocks, each block consisting of a poly(alkylene oxide) chain. For a two-block copolymer, one of the block consists of a poly(alkylene oxide) chain of hydrophilic nature and the other block consists of a poly(alkylene oxide) chain of hydrophobic nature. For a three-block copolymer, at least one of the blocks consists of a poly(alkylene oxide) chain of hydrophilic nature whereas at least one of the other blocks consists of a poly(alkylene oxide) chain of hydrophobic nature. Preferably, in the case of a three-block copolymer, the poly(alkylene oxide) chains of hydrophilic nature are poly(ethylene oxide) chains denoted by $(PEO)_X$ and $(PEO)_Z$, and the poly(alkylene oxide) chains of hydrophobic nature are poly(propylene oxide) chains denoted by $(PPO)_Y$, poly(butylene oxide) chains or mixed chains each chain of which is a mixture of several alkylene oxide monomers. More preferably, in the case of a three-block copolymer, it consists of two poly(ethylene oxide) chains and of one poly(propylene oxide) chain. More precisely, a compound of formula $(PEO)_X$-$(PPO)_Y$-$(PEO)_Z$ where x ranges between 5 and 300, y ranges between 33 and 300, and z ranges between 5 and 300 is used. Preferably, the values of x and z are identical. A compound wherein x=20, y=70 and z=20 (P123) and a compound wherein x=106, y=70 and z=106 (F127) are very advantageously used. The commercial non-ionic surfactants known as Pluronic (BASF), Tetronic (BASF), Triton (Sigma), Tergitol (Union Carbide) and Brij (Aldrich) can be used as non-ionic surfactants in stage b) of the preparation method according to the invention. For a four-block copolymer, two of the blocks consist of a poly(alkylene oxide) chain of hydrophilic nature and the other two blocks consist of a poly(alkylene oxide) chain of hydrophobic nature.

The solution obtained at the end of stage b) of the preparation method according to the invention wherein at least said surfactant and at least said clear solution obtained in stage a) are mixed can be acid, neutral or basic. Preferably, said solution is basic and it preferably has a pH value above 9, this pH value being generally imposed by the pH value of the clear solution containing the precursor elements of protozeolite entities obtained according to stage a) of the material preparation method of the invention. The solution obtained at the end of stage b) can be aqueous or it can be a mixture of water and organic solvent, the organic solvent preferably being a polar solvent, notably an alcohol, preferably ethanol.

The amount of organic compounds, i.e. of surfactant and of structuring agent, present in the mixture in accordance with stage b) of the preparation method according to the invention is defined in relation to the amount of inorganic matter present in said mixture after adding the clear solution containing the precursor elements of protozeolite entities according to stage a) of the method of the invention. The amount of inorganic matter corresponds to the amount of matter of the silicic precursor and of the precursor of element X when it is present. The $V_{inorganic}/V_{organic}$ volume ratio is such that the organic-inorganic binary system formed in atomization stage c) of the preparation method according to the invention undergoes a mesostructuration process through self-assembly of the surfactant jointly with the hydrolysis/condensation reactions of the various inorganic precursors. Said $V_{inorganic}/V_{organic}$ volume ratio is defined as follows: $V_{inorganic}/V_{organic} = (m_{inorg} * \rho_{org})/(m_{org} * \rho_{inorg})$ with $m_{inorg}$ the final mass of the inorganic fraction in form of condensed oxide(s) in the solid elementary particle obtained by atomization, $m_{org}$ the total mass of the non-volatile organic fraction found in the solid elementary particle obtained by atomization, $\rho_{org}$ and $\rho_{inorg}$ the densities respectively associated with the non-volatile organic and inorganic fractions. Within the scope of the invention, when element X is aluminium and for calculation simplification (approximations valid for a large majority of non-volatile organic fraction and for an inorganic fraction of "aluminosilicate network" type), we consider that $\rho_{org}=1$ and $\rho_{inorg}2$. Within the scope of the invention, $m_{inorg}$ generally corresponds to the mass of $SiO_2$ to which the mass of $AlO_2$ is added when X is aluminium, and $m_{org}$ corresponds to the mass of the structuring agent, TPAOH for example, to which the mass of the surfactant, surfactant F127 for example, is added. The polar solvent, preferably ethanol, as well as water and soda, are not taken into account in the calculation of said ratio $V_{inorganic}/V_{organic}$. The species comprising an element X, preferably the aluminic species optionally introduced, for the preparation of the material according to the invention, after carrying out said stage b), are not taken into account for the calculation of ratio $V_{inorganic}/V_{organic}$ defined above. In accordance with the invention, the amount of organic matter and the amount of inorganic matter in the mixture obtained after carrying out stage b) is such that ratio $V_{inorganic}/V_{organic}$ ranges between 0.26 and 4, preferably between 0.30 and 2. In accordance with stage b) of the method according to the invention, the initial concentration of the surfactant introduced in the mixture, defined by $c_o$, is such that $c_o$ is less than or equal to $c_{mc}$, parameter $c_{mc}$ representing the critical micellar concentration known to the person skilled in the art, i.e. the limit concentration beyond which the phenomenon of self-assembly of the surfactant molecules occurs in the solution obtained after stage b). Prior to atomization, the surfactant molecule concentration of the solution obtained after stage b) of the preparation method according to the invention does therefore not lead to the formation of particular micellar phases. In a preferred embodiment of the method according to the invention, concentration $c_o$ is less than $c_{mc}$, ratio $V_{inorganic}/V_{organic}$ is such that the composition of the binary system verifies the composition conditions for which a mesostructuration mechanism takes place through cooperative self-assembly of the reactants ($V_{inorganic}/V_{organic}$ ranging between 0.26 and 4, preferably between 0.3 and 2) and said solution sought in stage b) of the preparation method according to the invention is a basic water-alcohol mixture.

The mixture atomization stage according to stage c) of the preparation method according to the invention produces spherical droplets. The size distribution of these droplets is of lognormal type. The aerosol generator used here is a commercial device of 9306 A type provided by TSI having a 6-jet atomizer. Atomization of the solution occurs in a chamber into which a carrier gas, a $O_2/N_2$ mixture (dry air), is sent at a pressure P of 1.5 bar.

In accordance with stage d) of the preparation method according to the invention, said droplets are dried. Drying is carried out through the transportation of said droplets via the carrier gas, the $O_2/N_2$ mixture, in PVC tubes, which leads to the progressive evaporation of the solution, for example the basic aquo-organic solution obtained in stage b) of the preparation method according to the invention, and thus to the formation of spherical elementary particles. This drying procedure is completed by passage of said particles through an oven whose temperature can be adjusted, the usual temperature ranging between 50° C. and 600° C., preferably between 80° C. and 400° C., the residence time of the particles in the oven being of the order of one second. The particles are then recovered on a filter. A pump arranged at the end of the circuit favours delivery of the species in the aerosol experimental device. Drying of the droplets according to stage d) of the preparation method of the invention is advantageously followed by passage through a stove at a temperature ranging between 50° C. and 150° C.

In the particular case where element X optionally used for carrying out stage a) of the method according to the invention is the element aluminium and where the element sodium is present in the clear solution obtained in accordance with stage a) of the preparation method according to the invention via the use of sodium hydroxide and/or of a sodium-containing structuring agent providing the basicity of said clear solution, an additional stage of ionic exchange allowing the $Na^+$ cation to be exchanged for the $NH_4^+$ cation between stages d) and e) of the invention is preferably carried out. This exchange, which leads to the formation of $H^+$ protons after stage e) of the preparation method of the invention in the preferred case where elimination of the structuring agent and of the surfactant is performed by calcination in air, is carried out according to operating protocols known to the person skilled in the art. One of the usual methods consists in suspending the dried solid particles from stage d) of the preparation method of the invention in an aqueous solution of ammonium nitrate. The assembly is then brought to reflux for 1 to 6 hours. The particles are thereafter recovered by filtering (9000 rpm centrifugation), washed and then dried through passage in the stove at a temperature ranging between 50° C. and 150° C. This ion exchange/washing/drying cycle can be repeated several times and preferably two more times. This exchange cycle can also be performed after stages d) and e) of the method according to the invention. Under these conditions, stage e) is then repeated after the last exchange cycle so as to generate the $H^+$ protons as explained above.

In accordance with stage e) of the preparation method of the invention, elimination of the structuring agent and of the surfactant in order to obtain the material according to the invention with hierarchical porosity in the microporosity and mesoporosity domains and organized porosity in the mesoporosity domain is advantageously carried out by means of chemical extraction methods or thermal treatment, preferably by calcination in air in a temperature range between 300° C. and 1000° C., preferably between 400° C. and 600° C., for 1 to 24 hours, preferably for 2 to 12 hours.

If the solution prepared in stage b) of the preparation method according to the invention is a water-organic solvent mixture, preferably basic, it is essential that, during stage b) of the method, the surfactant concentration at the origin of the matrix mesostructuration be lower than the critical micellar concentration and that ratio $V_{inorganic}/V_{organic}$ ranges between 0.26 and 4, preferably between 0.30 and 2, so that the evaporation of said aquo-organic solution, preferably basic, during stage c) of the preparation method according to the invention by means of the aerosol technique induces a phenomenon of micellization or of self-assembly leading to the mesostructuration of the matrix of the material according to the invention. When $c_o < c_{mc}$, the mesostructuration of the matrix of the material according to the invention is the result of a progressive concentration, within each droplet, of the protozeolite entity precursor elements of the clear solution obtained in stage a) of the material preparation method according to the invention and of at least one surfactant introduced during stage b) of the preparation method according to the invention, up to a surfactant concentration $c > c_{mc}$ resulting from an evaporation of the preferably basic aquo-organic solution.

According to a first preferred embodiment of the preparation method of the invention, at least one precursor of at least one element X selected from among aluminium, iron, boron, indium and gallium, preferably aluminium, is introduced to carry out said stage b) of the method of the invention. Thus, mixing into a solution at least one surfactant and at least said clear solution obtained according to stage a) of the method of the invention is carried out in the presence of at least one precursor of said element X selected from among the aforementioned precursors of said element X, preferably the aluminic precursors described above in the present description, for carrying out said stage a) of the method of the invention. In accordance with said first preferred embodiment of the method of the invention, preparation of the clear solution according to stage a) of the preparation method of the invention is carried out either in the presence or in the absence of at least one precursor of at least one element X.

According to a second preferred embodiment of the preparation method of the invention, at least one precursor of at least one element X selected from among aluminium, iron, boron, indium and gallium, preferably aluminium, is introduced while carrying out said stage d) and/or said stage e) of the method of the invention in order to produce a surface modification of the material according to the invention. According to said second preferred embodiment of the preparation method of the invention, said precursor of at least one element X, preferably the aluminic precursor, is introduced while carrying out said stage d) and/or said stage e) by means of any surface modification technique known to the person skilled in the art, such as grafting at least one precursor of at least one element X, dry impregnation of at least one precursor of at least one element X and excess impregnation of at least one precursor of at least one element X. Said precursor of at least one element X, preferably an aluminic precursor, introduced while carrying out said stage d) and/or said stage e) of the method according to the invention by means of a surface modification technique is selected from among the precursors of said element X, preferably the aluminic precursors described above in the present description, for carrying out said stage a) of the method of the invention. According to said second preferred embodiment of the preparation method of the invention, stage a) of the method of the invention is carried out in the presence or in the absence of at least one precursor of at least one element X, preferably an aluminic precursor, and stage b) of the method of the invention is carried out in the presence or in the absence of at least one precursor of at least one element X, preferably an aluminic precursor.

According to the material preparation method of the invention, said first preferred embodiment of the preparation method of the invention and said second preferred embodiment of the preparation method of the invention are only optional variants of the material preparation method of the invention. Thus, when the mesostructured matrix of each spherical particle of the material according to the invention comprises an element X, preferably aluminium, said element X, preferably aluminium, is introduced either during said stage a) of the preparation method of the invention for preparing said clear solution, or during said stage b) according to said first preferred embodiment of the preparation method of the invention, or during said stage d) and/or said stage e) in accordance with said second preferred embodiment of the preparation method of the invention. Element X, preferably aluminium, can also be advantageously introduced, several times, while carrying out several stages according to all the possible combinations of the embodiments described above. In particular, it is advantageous to introduce the aluminium during said stage a) and said stage b) or during said stage a) and said stage d) and/or said stage e).

In the particular case where element X is aluminium, the amorphous aluminosilicate obtained according to the preparation method of the invention then has a Si/Al molar ratio defined from the amount of element silicon introduced during stage a) of the preparation method of the invention and from the total amount of element aluminium introduced in the stage(s) of the preparation method of the invention according to the various preferred embodiments described above. Under such conditions, the Si/Al molar ratio of the material according to the invention preferably ranges between 1 and 1000.

When said first preferred embodiment of the method of the invention is applied, the amounts of organic and inorganic matter to be introduced for carrying out stage b) have to be adjusted depending on the amount of additional matter of element X, preferably aluminium, introduced in said stage b) according to said first embodiment so that the total amount of organic and inorganic matter introduced for preparing the material according to the invention allows the occurrence of a micellization phenomenon leading to the mesostructuration of the matrix of each particle of said material.

The material with hierarchical porosity in the microporosity and mesoporosity domains and organized porosity in the mesoporosity domain according to the present invention can be obtained in form of powder, balls, pellets, granules or extrudates, the shaping operations being performed using conventional techniques known to the person skilled in the art. Preferably, the material with hierarchical porosity in the microporosity and mesoporosity domains and organized porosity in the mesoporosity domain according to the invention is obtained in form of a powder consisting of elementary spherical particles having a maximum diameter of 200 μm, which facilitates a possible reactant diffusion if the material according to the invention is used in a potential industrial application.

The material according to the invention with hierarchical porosity in the microporosity and mesoporosity domains and organized porosity in the mesoporosity domain is characterized by means of several analysis techniques, notably low-angle X-ray diffraction (LAXD), nitrogen volumetric analysis (BET), transmission electron microscopy (TEM), scanning electron microscopy (SEM) and X-ray fluorescence (XRF).

The low-angle X-ray diffraction technique (values of angle 2θ ranging between 0.5° and 3°) allows to characterize the periodicity on the nanometric scale generated by the organized mesoporosity of the mesostructured matrix of the material according to the invention. In the description hereafter, analysis of the X rays is carried out on powder with a reflection diffractometer equipped with a rear monochromator, using copper radiation (wavelength 1.5406 Å). The peaks usually observed in diffractograms corresponding to a given value of angle 2θ are associated with the inter-reticular distances $d_{(hkl)}$ characteristic of the structural symmetry of the material, ((hkl) being the Miller indices of the reciprocal network) by the Bragg relation: $2 d_{(hkl)}*\sin(\theta)=n*\lambda$. This indexing then allows to determine the cell parameters (abc) of the direct network, the value of these parameters depending on the hexagonal, cubic or vermicular structure obtained. For example, the low-angle X-ray diffractogram of a mesostructured material, the microporous matrix walls of each spherical particle of which consist of ZSM-5 type aluminosilicate protozeolite entities, obtained according to the material preparation method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ ($PEO_{106}$-$PPO^{70}$-$PEO_{106}$ or F127) as the surfactant, shows a correlation peak exhibiting perfect resolution, corresponding to the correlation distance d between pores characteristic of a vermicular type structure and defined by the Bragg relation:

$$2 d*\sin(\theta)=n*\lambda.$$

Nitrogen volumetric analysis, which corresponds to the physical adsorption of nitrogen molecules in the porosity of the material via a progressive pressure increase at constant temperature, provides information on the particular textural characteristics (mesopore diameter, porosity type, specific surface area) of the material according to the invention. In particular, it allows to know the total value of the micropore and mesopore volume of the material. The shape of the nitrogen adsorption isotherm and of the hysteresis loop can give information about the presence of the microporosity linked with the protozeolite entities making up the amorphous walls of the matrix of each spherical particle of the material according to the invention and about the nature of the mesoporosity. Quantitative analysis of the microporosity of the material according to the invention is carried out from the "t" (Lippens-De Boer method, 1965) or the "$\alpha_s$" (method provided by Sing) methods that correspond to transforms of the initial adsorption isotherm as described in "*Adsorption by powders and porous solids. Principles, methodology and applications*" written by F. Rouquerol, J. Rouquerol and K. Sing, Academic Press, 1999. These methods allow in particular to obtain the value of the micropore volume characteristic of the microporosity of the material according to the invention, as well as the specific surface area of the sample. The reference solid used is a LiChrospher Si-1000 silica (M. Jaroniec, M. Kruck, J. P. Olivier, *Langmuir,* 1999, 15, 5410). By way of example, the nitrogen adsorption isotherm of a mesostructured material the microporous matrix walls of each spherical particle of which consist of ZSM-5 type aluminosilicate protozeolite entities, obtained according to the material preparation method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ ($PEO_{106}$-$PPO_{70}$-$PEO_{106}$ or F127) as the surfactant, exhibits a great adsorption jump in the P/P0 low values range (where P0 is the saturated vapour pressure at temperature T), followed by a plateau with a very slight slope over a wide pressure range, characteristic of a microporous material and, for the higher P/P0 values, a type IV isotherm and a type H1 hysteresis loop, the associated pore distribution curve being representative of a mesopore population of uniform size centered in the 1.5-30 nm range. As regards the mesostructured matrix, the difference between the value of the mesopore diameter φ and the correlation distance between mesopores d defined by low-angle X-ray diffraction as described above allows to obtain quantity e where e=d−φ and is characteristic of the thickness of the amorphous walls of the mesostructured matrix of the material according to the invention. Similarly, curve $V_{ads}$ (ml/g)=f($\alpha_s$) obtained via the aforementioned $\alpha_s$ method is characteristic of the presence of microporosity within the material and it leads to a micropore volume value ranging between 0.01 and 0.4 ml/g. Determination of the total micropore and mesopore volume and of the micropore volume as described above leads to a mesopore volume value for the material according to the invention ranging between 0.01 and 1 ml/g.

Transmission electron microscopy (TEM) analysis is also a commonly used technique for characterizing the organized mesoporosity within the mesostructured matrix of the material according to the invention. TEM allows formation of an image of the solid studied, the contrasts observed being characteristic of the structural organization, the texture, the morphology or the chemical composition of the particles observed, and the resolution of the technique reaches 0.2 nm maximum. In the description hereafter, the TEM photos are obtained from michrotome sections of the sample in order to visualize a section of an elementary spherical particle of the material according to the invention. For example, the TEM images obtained for a mesostructured material the microporous matrix walls of each spherical particle of which consist of ZSM-5 type aluminosilicate protozeolite entities obtained according to the material preparation method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ ($PEO_{106}$-$PPO_{70}$-$PEO_{106}$ or F127) as the surfactant, exhibit spherical elementary particles having a vermicular mesostructure, the matter being defined by the dark zones. Analysis of the image also allows to obtain parameters d, φ and e characteristic of the mesostructured matrix defined above.

The morphology and the size distribution of the elementary particles were established by analysis of photos obtained by scanning electron microscopy (SEM).

The mesostructuration of the material according to the invention can be of vermicular, cubic or hexagonal type depending on the nature of the surfactant selected as the structuring agent.

The invention is illustrated by the following examples.

EXAMPLES

In the examples hereafter, the aerosol technique used is the technique described above in the description of the invention: a 9306 A model aerosol generator with a 6-jet atomizer provided by TSI is used.

For each one of the examples below, the $V_{inorganic}/V_{organic}$ ratio of the mixture from stage b) is calculated. This ratio is defined as follows: $V_{inorganic}/V_{organic}=(m_{inorg}*\rho_{org})/(m_{org}*\rho_{inorg})$ with $m_{inorg}$ the final mass of the inorganic fraction in form of condensed oxide(s), i.e. $SiO_2$ and $AlO_2$, in the solid elementary particle obtained by atomization, $m_{org}$ the total mass of the non-volatile organic fraction found in the solid elementary particle obtained by atomization, i.e. the surfactant and the structuring agent, $\rho_{org}$ and $\rho_{inorg}$ the densities respectively associated with the non-volatile organic and inorganic fractions. In the following examples, we consider that $\rho_{org}=1$ and $\rho_{inorg}=2$. Thus, the $V_{inorganic}/V_{organic}$ ratio is calculated as equal to $V_{inorganic}/V_{organic}=(m_{SiO2}+m_{AlO2})/[2*(m_{structuring\ agent}+m_{surfactant})]$. Ethanol, soda and water are not taken into account in the calculation of said $V_{inorganic}/V_{organic}$ ratio.

Example 1 (Invention)

Preparation of a material with hierarchical porosity in the microporosity and mesoporosity domains and organized porosity in the mesoporosity domain, whose microporous amorphous walls consist of ZSM-5 (MFI) type aluminosilicate protozeolite entities such that molar ratio Si/Al=59

6.86 g of a tetrapropylammonium hydroxide solution (TPAOH 40% by mass in an aqueous solution) are added to 0.37 g of aluminium sec-butoxide ($AlO(O^sC_4H_9)_3$). After 30-min strong stirring at ambient temperature, 27 g of demineralized water and 18.75 g of tetraethylorthosilicate (TEOS) are added. The mixture is left under strong stirring at ambient temperature for 18 hours so as to obtain a clear solution. A solution containing 66.61 g ethanol, 61.24 g water and 5.73 g surfactant F127 (pH value of the mixture=13.5) is then added to this solution. The $V_{inorganic}/V_{organic}$ ratio of the mixture is 0.32. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a drying temperature of 350° C. The powder collected is thereafter dried for 18 hours in a stove at 95° C. The powder is then calcined in air for 5 hours at 550° C. The solid is characterized by low-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.13 ml/g ($N_2$), a value of the mesopore volume $V_{meso}$ of 0.61 ml/g ($N_2$) and a specific surface area of the final material S=781 $m^2$/g. The mesopore diameter φ characteristic of the mesostructured matrix is 7 nm. The low-angle X-ray diffraction analysis leads to the visualization of a correlation peak at angle 2θ=0.78°. The Bragg relation 2 d*sin (θ)=1.5406 allows to calculate correlation distance d between the organized mesopores of the material, i.e. d=11.3 nm. The thickness of the walls of the mesostructured material defined by e=d−φ thus is e=4.3 nm. The Si/Al molar ratio obtained by XF is 59. A SEM image of the spherical elementary particles thus obtained shows that these particles have a size characterized by a diameter ranging between 50 and 3000 nm, the size distribution of these particles being around 300 nm.

Example 2 (Invention)

Preparation of a material with hierarchical porosity in the microporosity and mesoporosity domains and organized porosity in the mesoporosity domain, whose microporous amorphous walls consist of ZSM-5 (MFI) type aluminosilicate protozeolite entities such that molar ratio Si/Al=12

6.86 g of a tetrapropylammonium hydroxide solution (TPAOH 40% by mass in an aqueous solution) are added to 1.71 g of aluminium sec-butoxide ($Al(O^sC_4H_9)_3$). After 30-min strong stirring at ambient temperature, 27 g of demineralized water and 17.66 g of tetraethylorthosilicate (TEOS) are added. The mixture is left under strong stirring at ambient temperature for 4 days so as to obtain a clear solution. A solution containing 66.61 g ethanol, 61.24 g water and 5.73 g surfactant F127 (pH value of the mixture=12) is then added to this solution. The $V_{inorganic}/V_{organic}$ ratio of the mixture is 0.32 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a drying temperature of 350° C. The powder collected is thereafter dried for 18 hours in a stove at 95° C. The powder is then calcined in air for 5 hours at 550° C. The solid is characterized by low-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.03 ml/g ($N_2$), a value of the mesopore volume $V_{meso}$ of 0.45 ml/g (N2) and a specific surface area of the final material S=595 m²/g. The mesopore diameter φ characteristic of the mesostructured matrix is 5 nm. The low-angle X-ray diffraction analysis leads to the visualization of a correlation peak at angles 2θ=0.98°. The Bragg relation 2 d*sin(θ)=1.5406 allows to calculate correlation distance d between the organized mesopores of the material, i.e. d=9 nm. The thickness of the walls of the mesostructured material defined by e=d−φ thus is e=4 nm. The Si/Al molar ratio obtained by XF is 12. A SEM image of the spherical elementary particles thus obtained shows that these particles have a size characterized by a diameter ranging between 50 and 3000 nm, the size distribution of these particles being around 300 nm.

Example 3 (Invention)

Preparation of a material with hierarchical porosity in the microporosity and mesoporosity domains and organized porosity in the mesoporosity domain, whose microporous amorphous walls consist of silicalite (MFI) type silicic protozeolite entities 19.13 g of tetraethylorthosilicate (TEOS) are added to 6.86 g of a tetrapropylammonium hydroxide solution (TPAOH 40% by mass in an aqueous solution) and to 27 g of demineralized water. The mixture is left under strong stirring at ambient temperature for 18 hours so as to obtain a clear solution. This solution is then placed in for 5 hours in a stove at 80° C. A solution containing 66.61 g ethanol, 61.24 g water and 5.73 g surfactant F127 (pH value of the mixture=14.5) is then added to this solution. The $V_{inorganic}/V_{organic}$ ratio of the mixture is 0.32 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a drying temperature of 350° C. The powder collected is then dried for 18 hours in a stove at 95° C. The powder is then calcined in air for 5 hours at 550° C. The solid is characterized by low-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.05 ml/g ($N_2$), a value of the mesopore volume $V_{meso}$ of 0.45 ml/g ($N_2$) and a specific surface area of the final material S=430 m²/g. The mesopore diameter φ characteristic of the mesostructured matrix is 6 nm. The low-angle X-ray diffraction analysis leads to the visualization of a correlation peak at angle 2θ=0.86°. The Bragg relation 2 d*sin(θ)=1.5406 allows to calculate correlation distance d between the organized mesopores of the material, i.e. d=10.3 nm. The thickness of the walls of the mesostructured material defined by e=d−φ thus is e=4.3 nm. A SEM image of the spherical elementary particles thus obtained shows that these particles have a size characterized by a diameter ranging between 50 and 3000 nm, the size distribution of these particles being around 300 nm.

Example 4 (Invention)

Preparation of a material with hierarchical porosity in the microporosity and mesoporosity domains and organized porosity in the mesoporosity domain, whose microporous amorphous walls consist of Beta (BEA) type aluminosilicate protozeolite entities such that the molar ratio Si/Al=59

4.96 g of a tetraethylammonium hydroxide solution (TEAOH 40% by mass in an aqueous solution) are added to 0.37 g of aluminium sec-butoxide ($Al(O^sC_4H_9)_3$). After 30-min strong stirring at ambient temperature, 27 g of demineralized water and 18.75 g of tetraethylorthosilicate (TEOS) are added. The mixture is left under strong stirring at ambient temperature for 18 hours so as to obtain a clear solution. A solution containing 66.61 g ethanol, 61.24 g water and 5.73 g surfactant F127 (pH value of the mixture=13.5) is then added to this solution. The $V_{inorganic}/V_{organic}$ ratio of the mixture is 0.35 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a drying temperature of 350° C. The powder collected is then dried for 18 hours in a stove at 95° C. The powder is then calcined in air for 5 hours at 550° C. The solid is characterized by low-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.09 ml/g ($N_2$), a value of the mesopore volume $V_{meso}$ of 0.52 ml/g ($N_2$) and a specific surface area of the final material S=634 m²/g. The mesopore diameter φ characteristic of the mesostructured matrix is 4 nm. The low-angle X-ray diffraction analysis leads to the visualization of a correlation peak at angle 2θ=1.09°. The Bragg relation 2 d*sin(θ)=1.5406 allows to calculate correlation distance d between the organized mesopores of the material, i.e. d=8.1 nm. The thickness of the walls of the mesostructured material defined by e=d−φ thus is e=4.1 nm. The Si/Al molar ratio obtained by XF is 59. A SEM image of the spherical elementary particles thus obtained shows that these particles have a size characterized by a diameter ranging between 50 and 3000 nm, the size distribution of these particles being around 300 nm.

Example 5 (Invention)

Preparation of a material with hierarchical porosity in the microporosity and mesoporosity domains and organized porosity in the mesoporosity domain, whose microporous amorphous walls consist of aluminosilicate protozeolite entities such that the molar ratio Si/Al=21

6.86 g of a tetrapropylammonium hydroxide solution (TPAOH 40% by mass in an aqueous solution) are added to 0.37 g of aluminium sec-butoxide ($Al(O^sC_4H_9)_3$). After 30-min strong stirring at ambient temperature, 27 g of demineralized water and 18.75 g of tetraethylorthosilicate (TEOS) are added. The mixture is left under strong stirring at ambient temperature for 18 hours so as to obtain a clear solution. A solution containing 66.61 g ethanol, 61.24 g water and 5.73 g surfactant F127 (pH value of the mixture=13.5) is then added to this solution. The $V_{inorganic}/V_{organic}$ ratio of the mixture is 0.32 and it is calculated as described above. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a drying temperature of 350° C. The powder collected is thereafter dried for 18 hours in a stove at 95° C. The powder is then calcined in air for 5 hours at 550° C. 1 g of this powder is placed under primary vacuum at 110° C. for 4 hours, then inerted with argon. 0.255 g of $(Al(O^sC_4H_9)_3)$ is dissolved in 50 ml pentane in an inert atmosphere, then added to the powder. The mixture is thereafter brought to reflux under stirring for 12 h. The solid obtained is washed three times with 50 ml pentane, then dried in an argon stream for 2 hours, drawn under vacuum, dried in ambient air, then in the stove at 100° C. for 1 night. The powder is calcined for 5 h at 550° C. The solid is characterized by low-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.04 ml/g ($N_2$), a value of the mesopore volume $V_{meso}$ of 0.49 ml/g ($N_2$) and a specific surface area of the final material S=593 $m^2$/g. The mesopore diameter $\phi$ characteristic of the mesostructured matrix is 6 nm. The low-angle X-ray diffraction analysis leads to the visualization of a correlation peak at angle $2\theta$=0.78°. The Bragg relation 2 d*sin $(\theta)$=1.5406 allows to calculate correlation distance d between the organized mesopores of the material, i.e. d=11.3 nm. The thickness of the walls of the mesostructured material defined by e=d−$\phi$ thus is e=5.3 nm. The Si/Al molar ratio obtained by XF is 21. A SEM image of the spherical elementary particles thus obtained shows that these particles have a size characterized by a diameter ranging between 50 nm and 3000 nm, the size distribution of these particles being around 300 nm.

The invention claimed is:

1. A material with hierarchical porosity comprising at least two elementary spherical particles, each one of said particles comprising a matrix based on silicon oxide, mesostructured, having a mesopore diameter ranging between 1.5 and 30 nm and exhibiting amorphous and microporous walls of thickness ranging between 1.5 and 50 nm, said elementary spherical particles having a maximum diameter of 200 microns, said amorphous walls consisting of protozeolite entities.

2. A material as claimed in claim 1, such that the diameter of the mesopores ranges between 1.5 and 15 nm.

3. A material as claimed in claim 1, such that the diameter of the micropores present within said amorphous walls is below 1.5 nm.

4. A material as claimed in claim 1, such that said protozeolite entities are species priming at least one zeolite that is MFI, BEA, FAU or LTA structure.

5. A material as claimed in claim 1, such that the matrix based on silicon oxide is entirely silicic.

6. A material as claimed in claim 1, such that the matrix based on silicon oxide comprises at least one element X selected from among aluminium, iron, boron, indium and gallium.

7. A material as claimed in claim 6, such that element X is aluminium.

8. A material as claimed in claim 1, such that said mesostructured matrix has a hexagonal, cubic or vermicular structure.

9. A material as claimed in claim 1, such that said elementary spherical particles have a diameter ranging between 50 nm and 3 microns.

10. A material as claimed in claim 1, such that it has a specific surface area ranging between 200 and 1000 $m^2$/g.

11. A method of preparing a material as claimed in claim 1, comprising: a) preparing a clear solution containing the protozeolite entity precursor elements: at least one structuring agent, at least one silicic precursor and optionally at least one precursor of at least one element X that is aluminium, iron, boron, indium or gallium; b) mixing into a solution at least one surfactant and at least said clear solution obtained in stage a) such that the ratio of the volumes of inorganic and organic matter $V_{inorganic}/V_{organic}$ ranges between 0.26 and 4; c) aerosol atomizing said solution obtained in stage b) so as to lead to the formation of spherical droplets; d) drying said droplets; and e) eliminating said structuring agent and said surfactant so as to obtain an amorphous material with hierarchical porosity in the microporosity and mesoporosity domains and organized porosity in the mesoporosity domain.

12. A method as claimed in claim 11, such that the ratio of the inorganic and organic matter volumes ranges between 0.3 and 2.

13. A method as claimed in claim 11, such that element X is aluminium.

14. A method as claimed in claim 11, such that said surfactant is a three-block copolymer, each block consisting of a poly(alkylene oxide) chain.

15. A method as claimed in claim 14, such that said three-block copolymer consists of two poly(ethylene oxide) chains and of one poly(propylene oxide) chain.

16. A method as claimed in claim 11, such that at least one precursor of at least one element X selected from among aluminium, iron, boron, indium and gallium is introduced for carrying out said stage b).

17. A method as claimed in claim 11, such that at least one precursor of at least one element X selected from among aluminium, iron, boron, indium and gallium is introduced while carrying out said stage d) and/or said stage e).

* * * * *